United States Patent
Tong

(10) Patent No.: US 10,478,897 B2
(45) Date of Patent: Nov. 19, 2019

(54) SHEET METAL SYSTEM AND MANUFACTURING PROCESS JOINING INCREMENTAL FORMING AND DIRECT METAL DEPOSITION

(71) Applicant: GM Global Technology Operations LLC, Detroit, MI (US)

(72) Inventor: Yiran Tong, Chatsworth, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 313 days.

(21) Appl. No.: 15/398,164

(22) Filed: Jan. 4, 2017

(65) Prior Publication Data

US 2018/0185921 A1 Jul. 5, 2018

(51) Int. Cl.
| | | |
|---|---|---|
| *B22F 7/04* | (2006.01) | |
| *B33Y 10/00* | (2015.01) | |
| *B33Y 30/00* | (2015.01) | |
| *B21D 31/00* | (2006.01) | |
| *B33Y 40/00* | (2015.01) | |
| *B23K 101/00* | (2006.01) | |

(52) U.S. Cl.
CPC .............. *B22F 7/04* (2013.01); *B21D 31/005* (2013.01); *B33Y 10/00* (2014.12); *B33Y 30/00* (2014.12); *B22F 2007/042* (2013.01); *B23K 2101/006* (2018.08); *B33Y 40/00* (2014.12)

(58) Field of Classification Search
CPC .... B22F 5/006; B22F 7/02; B22F 7/04; B22F 2007/042; B33Y 10/00; B33Y 30/00; B33Y 40/00; B33Y 80/00; B23P 23/04; B21D 31/005; B21D 35/007
See application file for complete search history.

(56) References Cited

U.S. PATENT DOCUMENTS

| | | | |
|---|---|---|---|
| 6,441,338 B1* | 8/2002 | Rabinovich | B21D 37/205 219/121.64 |
| 2004/0187548 A1* | 9/2004 | Okada | B21D 22/14 72/379.2 |
| 2009/0226272 A1* | 9/2009 | Smith | B21D 22/18 409/80 |
| 2015/0000108 A1* | 1/2015 | Hascoet | B23P 15/00 29/527.2 |
| 2017/0002978 A1* | 1/2017 | Ballinger | F17C 1/08 |
| 2018/0264538 A1* | 9/2018 | Roth | B21D 37/16 |
| 2019/0099799 A1* | 4/2019 | Roth | B21D 31/005 |

* cited by examiner

Primary Examiner — Edward T Tolan

(57) ABSTRACT

A sheet metal system having incremental forming and direct metal deposition, includes a plate. A groove is created in the plate. A direct metal deposition tool is positioned within the groove. A material is deposited by the direct metal deposition tool onto a surface within the groove creating a rib.

12 Claims, 4 Drawing Sheets

SHEET METAL SYSTEM AND MANUFACTURING PROCESS JOINING INCREMENTAL FORMING AND DIRECT METAL DEPOSITION

INTRODUCTION

The present disclosure relates to sheet metal manufacturing using both incremental forming and direct metal deposition.

Sheet metal used for automobile vehicle components such as body panels and beams is commonly formed using a brake or bending operation to create indentations which increase an overall stiffness of the sheet metal component. Such operations however may locally reduce material strength due to wall thinning at the indentations. It is therefore known to add separate pieces such as ribs which transversely cross the indentations, the ribs adding strength back to the locally reduced wall thickness areas of the indentations while adding little additional weight. The addition of one or more ribs commonly requires a die to hold the component in a dimensionally stable condition, a separate operation to cut and form of the ribs from other sheet material, and a further separate operation such as a welding or brazing operation to fix the ribs to the sheet metal component. Each of the die and these separate operations adds to construction time and cost of the plate assembly.

Thus, while current sheet metal components having reinforcing ribs in areas of indentations achieve their intended purpose, there is a need for a new and improved system and method for providing stiffness to sheet metal components without the use of dies, or the cost and time of the multiple steps required to cut and install reinforcing ribs.

SUMMARY

According to several aspects, a sheet metal system having incremental forming and direct metal deposition include a plate. A groove is created in the plate. A direct metal deposition tool is positioned within the groove. A material is deposited by the direct metal deposition tool onto a surface within the groove creating a rib.

In an additional aspect of the present disclosure, the material deposited matches a material of the plate.

In another aspect of the present disclosure, a surface of the groove is depressed below a planar surface defined by a first plate portion and a second plate portion.

In another aspect of the present disclosure, the rib extends across an entire width of the groove transverse to a longitudinal axis of the groove.

In another aspect of the present disclosure, the material is deposited by the direct metal deposition tool onto an additional surface of the plate.

In another aspect of the present disclosure, a movable machine portion movable toward and away from a table. The movable machine portion includes: a tool holding head whose movement is controlled by a computer operated machine; and a retractable and extendable incremental forming tool supported by the tool holding head, the incremental forming tool adapted to depress the plate to create the groove.

In another aspect of the present disclosure, the direct metal deposition tool is supported by the tool holding head.

In another aspect of the present disclosure, the direct metal deposition tool defines a 3D printer head.

In another aspect of the present disclosure, a final height of the rib includes multiple layers of material individually and sequentially deposited by the direct metal deposition tool.

In another aspect of the present disclosure, the rib having the final height is repeated at multiple locations in the groove.

In another aspect of the present disclosure, the groove has a curved geometry, and the rib has a curved geometry substantially matching the curved geometry of the groove.

In another aspect of the present disclosure, the groove extends across an entire width of the plate.

In another aspect of the present disclosure, the groove includes opposed groove walls integrally connected to and transversely extending from a groove bottom wall, the groove bottom wall having a convex shaped outer surface in a longitudinal direction of the groove.

In another aspect of the present disclosure, the groove includes: a semi-spherical geometry having a semi-spherical shaped wall; and multiple ones of the ribs include intersecting first and second ribs integrally connected to the semi-spherical shaped wall and to a central connector.

According to several aspects, a method for operating a sheet metal system having incremental forming and direct metal deposition includes: depressing an incremental forming tool into a plate deforming the plate to create a groove, with a surface of the groove depressed below a planar surface defined by a first plate portion and a second plate portion; temporarily positioning a direct metal deposition tool within the groove; and depositing a material by operation of the direct metal deposition tool onto the surface creating a rib.

In another aspect of the present disclosure, the method includes further depressing the plate within the groove using the incremental forming tool to increase a depth of the groove after depositing the material to create the rib.

In another aspect of the present disclosure, the method includes operating the direct metal deposition tool to increase a height of the rib up to the depth of the groove.

In another aspect of the present disclosure, the method includes continuing to deposit the material onto the rib using the direct metal deposition tool until the rib directly contacts each of a first groove edge and an oppositely facing second groove edge.

In another aspect of the present disclosure, the method includes continuing to deposit the material onto the rib using the direct metal deposition tool until the rib extends across an entire width of the groove.

According to several aspects, a method for operating a sheet metal system having incremental forming and direct metal deposition includes: depressing an incremental forming tool into a plate deforming the plate to create a groove having a first depth; removing the incremental forming tool from the groove; temporarily positioning a direct metal deposition tool within the groove; depositing a material by operation of the direct metal deposition tool onto a surface of the groove creating a rib; removing the direct metal deposition tool from within the groove; returning the incremental forming tool into the groove; further depressing the incremental forming tool into the plate to create a groove second depth greater than the first depth; moving the incremental forming tool out of the groove; returning the direct metal deposition tool into the groove; and depositing an additional amount of the material by operation of the direct metal deposition tool onto the rib to increase a height of the rib.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
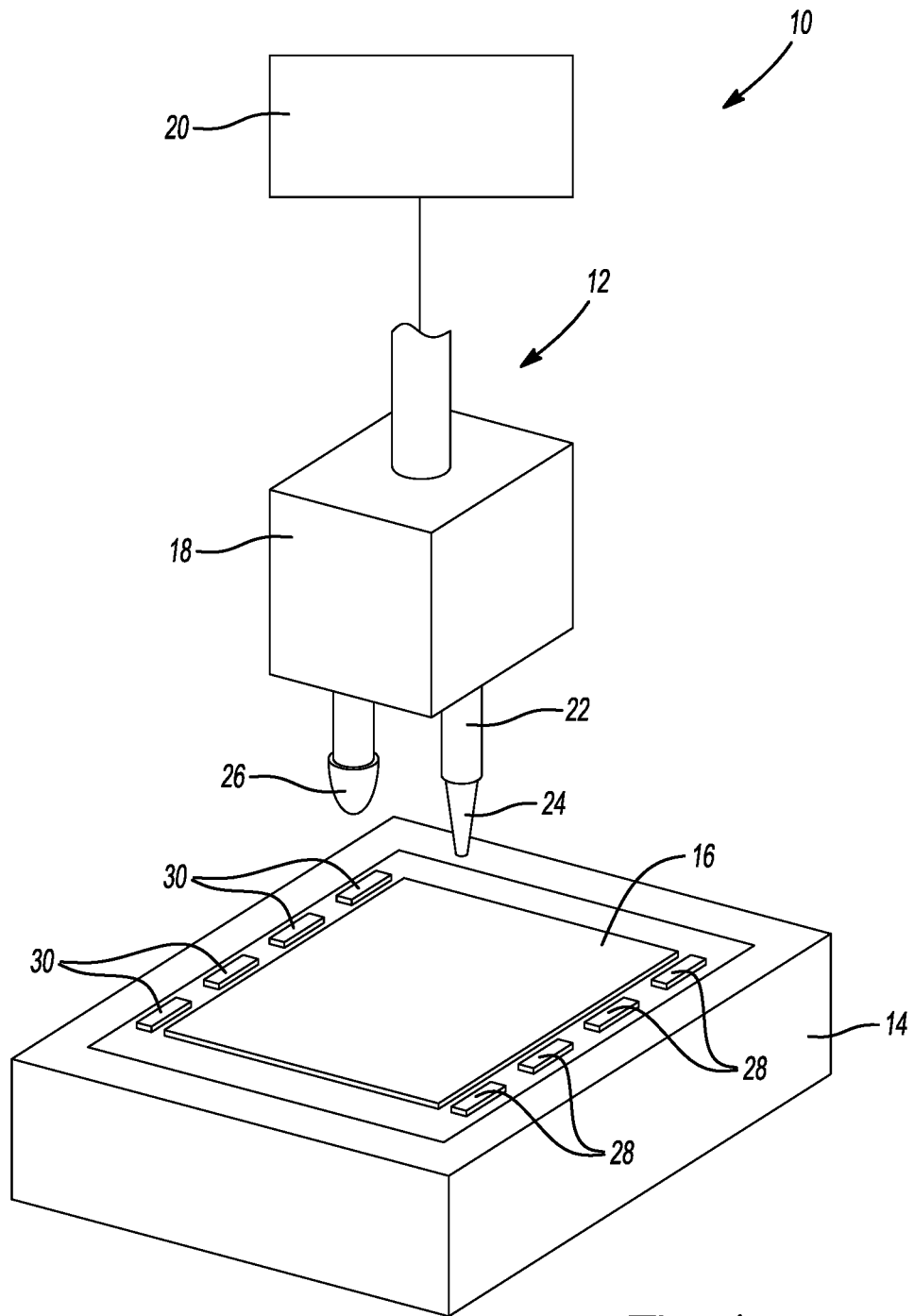
FIG. 1 is a front perspective view of a sheet metal system for incremental forming and direct metal deposition according to an exemplary aspect.

Referring to FIG. 1, a sheet metal system for incremental forming and direct metal deposition 10 includes a movable machine portion 12 which is movable toward and away from a table 14 and used to create features on a plate 16. The movable machine portion 12 includes a tool holding head 18 whose movement is controlled by a computer operated machine 20 such as a computer numeric control (CNC) machine. The tool holding head 18 supports a retractable and extendable incremental forming tool 22 having a forming tool head 24 and a direct metal deposition tool 26 such as a 3D printer head. The plate 16 is shown having a planar form, however the plate 16 can have any desired geometric form desired and can be pre-formed in shapes other than planar such as angular or curved. The sheet or plate 16 can be a metal such as a steel or an aluminum, or a metal composite material including carbon fiber.

The tool holding head 18 can be moved toward and away from the plate 16, and at least the incremental forming tool 22 can also be individually moved toward and away from the plate 16. The forming tool head 24 of the incremental forming tool 22 when forced downwardly into contact with the plate 16 permanently deforms the plate 16 by yielding material of the plate 16 to create one or more dimples, ridges, slots, grooves, or ditches, hereinafter collectively referred to as "grooves". A first plurality of clamps 28 and a second plurality of clamps 30 firmly hold the plate 16 to prevent material of the plate 16 from displacing horizontally during the formation of the grooves.

A method for using the sheet metal system for incremental forming and direct metal deposition 10 of the present disclosure to create grooves and reinforcing ribs includes multiple actions or steps. In a first step the plate 16 is mounted and retained in a fixed position on the table 14 using the first plurality of clamps 28 mounted onto the table 14 functioning to releasably clamp the plate 16 onto the table 14, and the similar but oppositely positioned second plurality of clamps 30.

Figure 2:
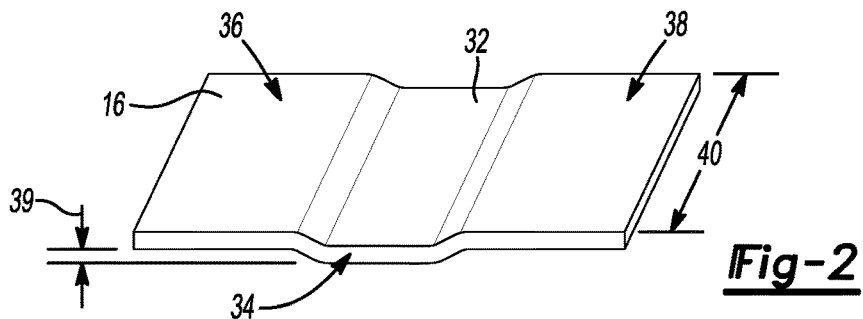
FIG. 2 is a top perspective view of a groove formed using the sheet metal system for incremental forming and direct metal deposition of FIG. 1.

Referring to FIG. 2 and again to FIG. 1, in a second step the forming tool head 24 of the incremental forming tool 22 is depressed into the plate 16 deforming the material of the plate 16 to create a groove 32. A surface 34 of the groove 32 is depressed below a planar surface defined by a first plate portion 36 and a second plate portion 38 retained by the first plurality of clamps 28 and the second plurality of clamps 30 such that the groove 32 has a first depth 39. According to several aspects, the groove 32 can be formed to extend across an entire width 40 of the plate 16. According to further aspects, the groove 32 can be formed in only a portion of the width 40 of the plate 16, or multiple grooves 32 can be formed across the width 40. The incremental forming tool 22 is then retracted away from the plate 16.

Figure 3:
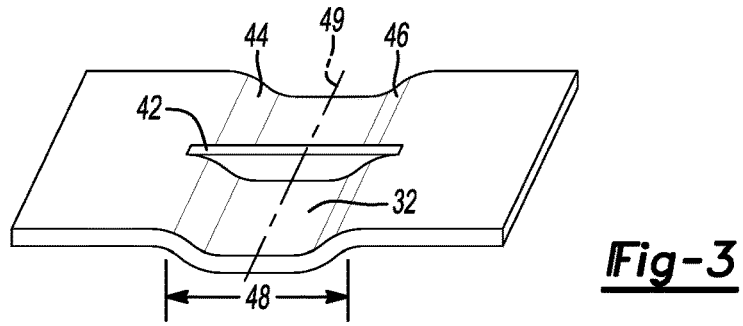
FIG. 3 is a top perspective view of the groove of FIG. 2 having a first layer of rib formed.

Referring to FIG. 3, in a third step the direct metal deposition tool 26 is positioned within the groove 32 and is operated to deposit a material onto the surface 34 creating a rib 42. According to several aspects a material of the plate 16 is a steel or aluminum, and a material deposited by the direct metal deposition tool 26 substantially matches the material of the plate 16. The rib 42 is deposited until material of the rib 42 directly contacts each of a first groove edge 44 and an oppositely facing second groove edge 46. Operation of the direct metal deposition tool 26 is continued until the rib 42 extends across an entire width 48 of the groove 32. According to several aspects, the rib 42 is oriented substantially transverse to a longitudinal axis 49 of the groove 32.

According to further aspects, the rib 42 is not extended across the entire width 48 of the groove 32. The rib 42 can be connected to the bottom of the groove 32 and further connected to either or both of the first groove edge 44 or the oppositely facing second groove edge 46. The rib 42 also does not have to extend to a full depth of the groove 32, and can therefore reach only to a partial height of the groove. The rib 42 can therefore be provided at any desired length or height in one or multiple operations of the direct metal deposition tool 26.

According to further aspects, the direct metal deposition tool 26 can further be used to add one or more layers of material onto any surface of the plate 16, including at any location where material thinning may occur due to bending or forming performed by the incremental forming tool 22. Material can also be added onto the plate 16 by the direct metal deposition tool 26 at any location where additional material thickness is desired at this or any further step in the process. A more aggressive shape of the completed plate 16 and additional strength at bending regions can thereby be provided. Upon completion of the rib 42 and after any further material addition by the direct metal deposition tool 26, the direct metal deposition tool 26 is retracted from the groove 32.

Referring to FIG. 4, and again to FIG. 3, in a fourth step the incremental forming tool 22 is again positioned within the groove 32 and depressed into the plate 16 to deepen the groove 32 thereby creating a groove 50 having a second depth 51 greater than the first depth 39. The incremental forming tool 22 can be moved as necessary to position the incremental forming tool 22 on opposite sides of the rib 42 during formation of the groove 50. Upon completion of the groove 50 to the desired second depth 51 below the plane defined by the first plate portion 36 and the second plate portion 38, the incremental forming tool 22 is retracted from the groove 50.

Figure 4:
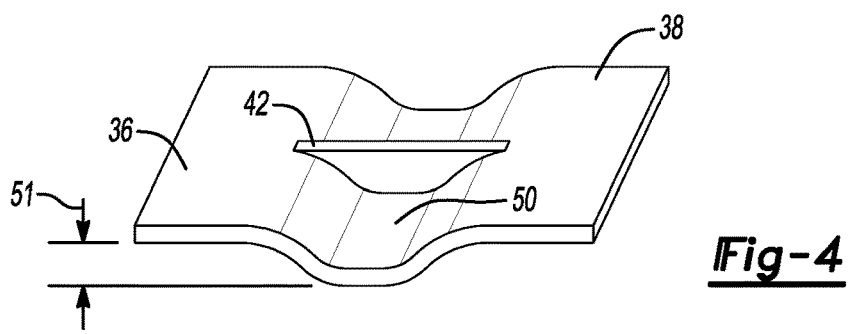
FIG. 4 is a top perspective view of the groove of FIG. 3 after further depth increase of the groove.

Referring to FIG. 5 and again to FIG. 4, in a fifth step the direct metal deposition tool 26 is re-positioned within the groove 50 and operated to deposit additional material 52 onto the rib 42, increasing a height of the rib 42 thereby creating an increased height rib 54. The increased height rib 54 directly contacts each of a third groove edge 56 and an opposite fourth groove edge 58 defined when the groove 50 was deepened from the groove 32. Operation of the direct metal deposition tool 26 is continued until the rib 54 extends across an entire width 60 of the groove 50. Upon completion of the rib 54, the direct metal deposition tool 26 is retracted from the groove 50.

Figure 5:
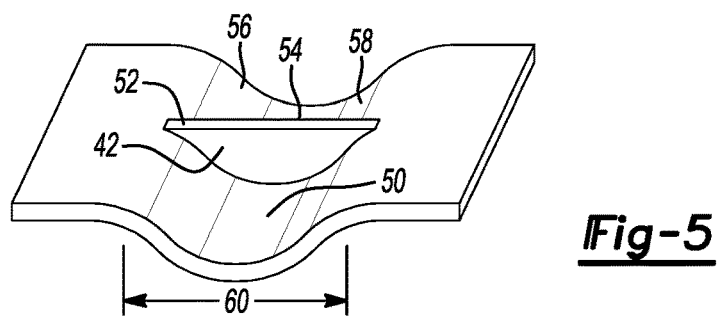
FIG. 5 is a top perspective view of the groove of FIG. 4 having a second layer of rib formed.
Figure 6:
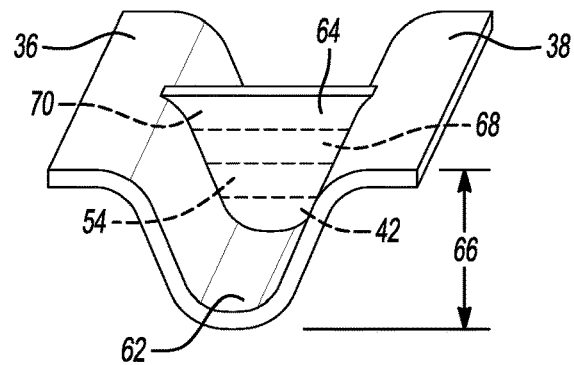
FIG. 6 is a top perspective view of a completed groove and rib formed by the sheet metal system for incremental forming and direct metal deposition of the present disclosure.

Referring to FIG. 6 and again to FIG. 5, the above steps of increasing the groove depth and build-up of the height of the rib can be repeated at least once or multiple more times to create a maximum depth groove 62 having a final height rib 64. According to several aspects the final height rib 64 can extend for an entire final height 66 of the groove 62, or can have a height less than the final height 66. The final height rib 64 can be made for example having multiple layers of material individually and sequentially deposited by the direct metal deposition tool 26, including material defining the rib 42, the rib 54, an additional rib portion 68 and a final rib portion 70. The final height rib 64 can also be repeated or duplicated in more than one location in the groove 62 as desired by repeating the above steps and also by increasing the quantity of the tool holding heads 18.

Referring to FIG. 7 and again to FIGS. 1-6, according to further aspects a sheet metal system for incremental forming and direct metal deposition 72 is modified from the sheet metal system for incremental forming and direct metal deposition 10 to provide a groove 74 having a curved geometry. The groove 74 includes opposed groove walls 76, 78 integrally connected to and transversely extending from a groove bottom wall 80. The opposed groove walls 76, 78 can be formed by deepening in incremental steps similar to the completed groove shown in FIG. 6. The groove bottom wall 80 provides a convex shaped outer surface 82 oriented in a longitudinal direction of the groove 74. A rib 84 can be formed in multiple incremental steps similar to the final height rib 64 and is positioned transverse to the opposed groove walls 76, 78.

Figure 7:
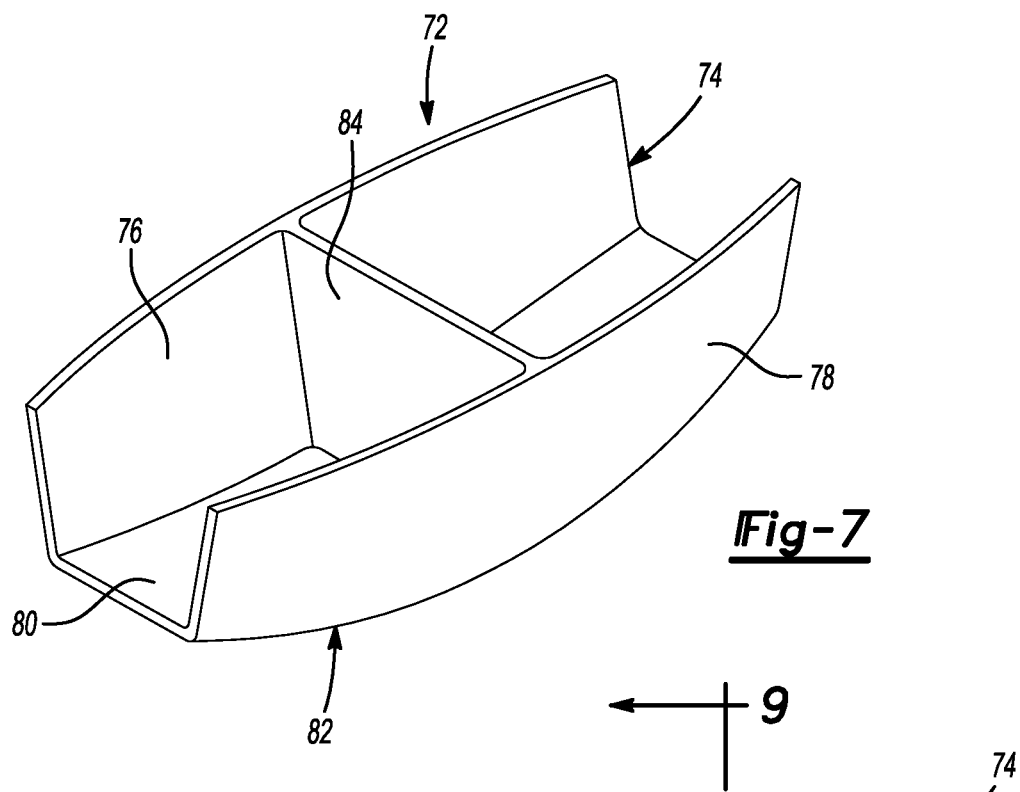
FIG. 7 is a front left perspective view of a groove with a reinforcing rib according to a further aspect of the present disclosure.

Referring to FIG. 8 and again to FIG. 7, the opposed groove walls 76, 78 of the groove 74 can be parallel and oppositely facing, concave shaped walls as shown, or can be any desired geometric shape including convex shaped. The rib 84 can be positioned at any location within the groove 74, including substantially at a central location where the opposed groove walls 76, 78 are at a maximum spacing.

Figure 8:
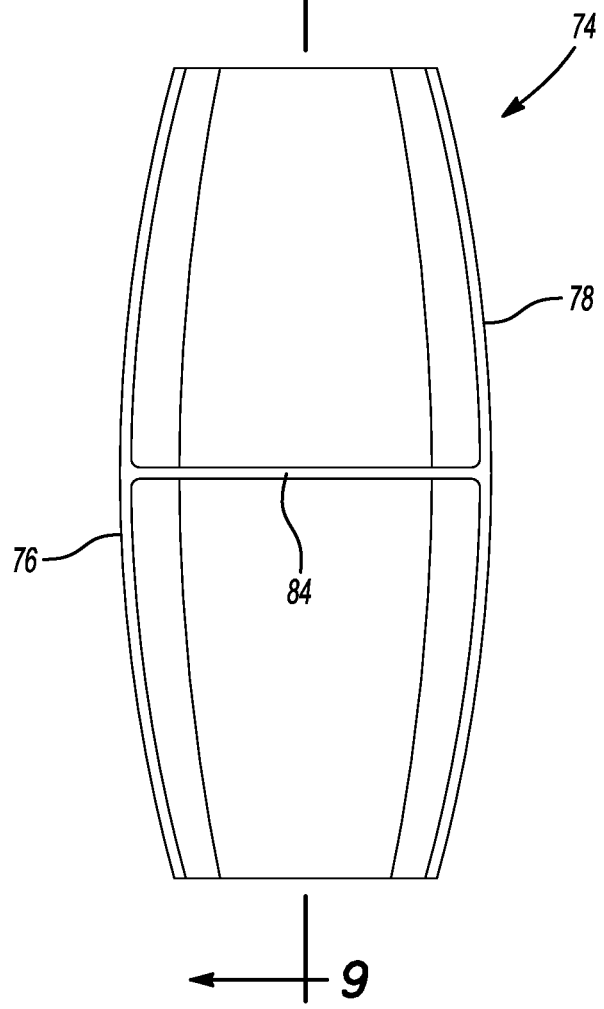
FIG. 8 is a top plan view of the groove of FIG. 7.
Figure 9:
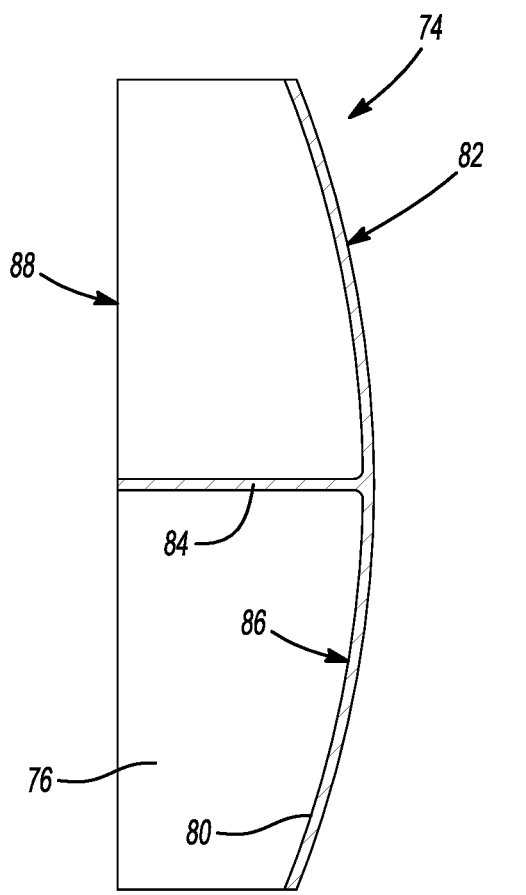
FIG. 9 is a front elevational cross sectional view taken at section 9 of FIG. 8.

Referring to FIG. 9 and again to FIGS. 7-8, based on the curved geometry of the groove 74, the rib 84 can be positioned at a maximum depth of the groove 74, for example at a maximum depth position 86 with respect to an upper wall end 88 of the opposed groove walls 76, 78 (only groove wall 76 is visible in this view).

Figure 10:
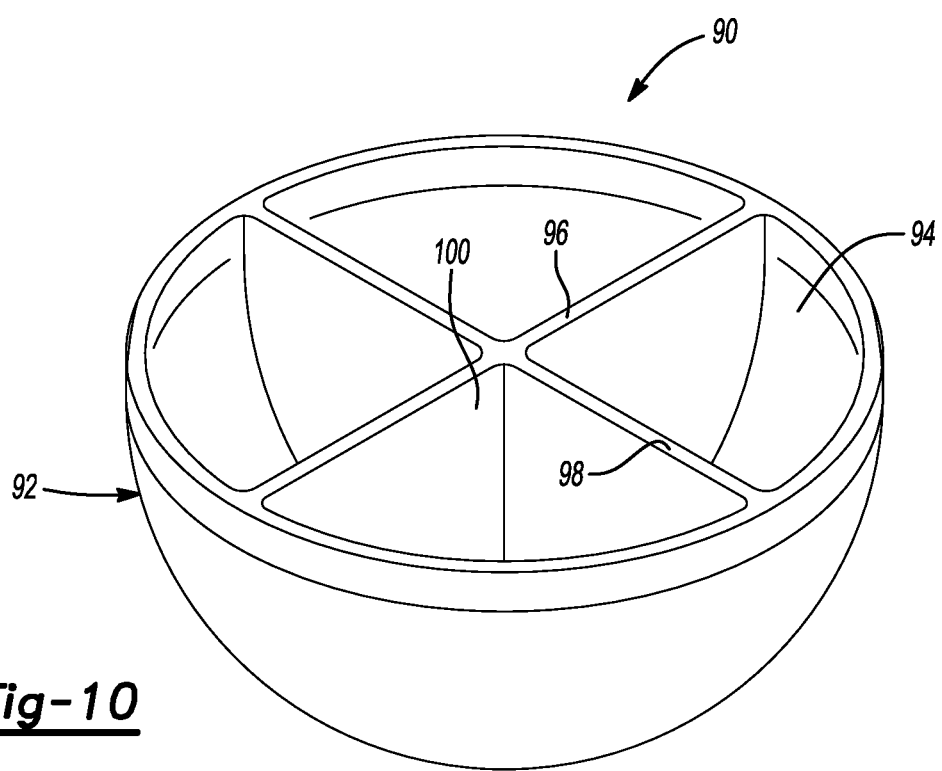
FIG. 10 is a top perspective view of another groove with a crossed reinforcing rib according to a further aspect of the present disclosure.

Referring to FIG. 10 and again to FIGS. 1-9, according to further aspects a sheet metal system for incremental forming and direct metal deposition 90 is modified from the sheet metal systems for incremental forming and direct metal deposition 10, 72 to provide a groove 92 having a semi-spherical geometry. The groove 92 has a semi-spherical shaped groove wall 94 which can include multiple ribs. The groove wall 94 can be formed by deepening in incremental steps similar to the completed groove shown in FIG. 6. In this aspect, crossed or intersecting first and second ribs 96, 98 are integrally connected to the semi-spherical shaped groove wall 94 and to a central connector 100. The first and second ribs 96, 98 can also be formed by incremental deposition of material similar to the formation of final height rib 64 previously described in reference to FIGS. 3-6.

According to several aspects, a method for operating a sheet metal system having incremental forming and direct metal deposition 10 includes the steps of: depressing an incremental forming tool into a plate 16 deforming the plate 16 to create a groove 32 having a first depth 39; removing the incremental forming tool 22 from the groove 32; temporarily positioning a direct metal deposition tool 26 within the groove 32; depositing a material by operation of the direct metal deposition tool 26 onto a surface 34 of the groove 32 creating a rib 42; removing the direct metal deposition tool 26 from within the groove 32; returning the incremental forming tool 22 into the groove 32; further depressing the incremental forming tool 22 into the plate 16 to create a groove second depth 51 greater than the first depth 39; moving the incremental forming tool 22 out of the groove 32; returning the direct metal deposition tool 26 into the groove 32; and depositing an additional amount of the material by operation of the direct metal deposition tool 26 onto the rib 42 to increase a height of the rib.

The sheet metal systems for incremental forming and direct metal deposition 10, 72, 90 of the present disclosure offer several advantages. These include the ability to form reinforcing ribs 42 which are oriented transverse to a groove formed in a panel without a negative die holding the panel. The groove can be incrementally deepened to a desired depth to achieve panel stiffness. Additional grooves can also be added. A metal deposition tool 26 acting similar to a 3 dimensional (3D) printer can be used to build up a height of the rib 42 or ribs in multiple incremental steps to create a final height rib 64 of any desired height to match the desired depth of the groove. Incremental formation of the ribs using a metal deposition tool after incremental deepening of the groove allows multiple ribs to be located without having to weld or braze individually cut and shaped ribs.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A sheet metal system having incremental forming and direct metal deposition, including: a retractable and extendable incremental forming tool supported together with a direct metal deposition tool by a tool holding head;
   a plate;
   a groove created in the plate, in a first stage to a first groove depth;
   the direct metal deposition tool temporarily positioned within the groove;
   a material deposited by the direct metal deposition tool onto a surface within the groove creating a rib defining a first height rib extending through the first groove depth, the rib directly connected for an entire length of the first height rib to a vertical wall defined by the groove, the first height rib oriented transverse to the vertical wall;

the groove when modified in a second stage has a second groove depth greater than the first groove depth; and an additional amount of the material deposited onto the first height rib after the second stage creates a second height rib extending through the second groove depth.

2. The sheet metal system having incremental forming and direct metal deposition of claim 1, wherein the rib extends across an entire width of the groove transverse to a longitudinal axis of the groove.

3. The sheet metal system having incremental forming and direct metal deposition of claim 1, wherein the material is deposited by the direct metal deposition tool onto an additional surface of the plate.

4. The sheet metal system having incremental forming and direct metal deposition of claim 1, further including a movable machine portion movable toward and away from a table, the movable machine portion having:

a tool holding head whose movement is controlled by a computer operated machine; and a retractable and extendable incremental forming tool supported by the tool holding head, the incremental forming tool adapted to depress the plate to create the groove.

5. The sheet metal system having incremental forming and direct metal deposition of claim 4, wherein the direct metal deposition tool is supported by the tool holding head.

6. The sheet metal system having incremental forming and direct metal deposition of claim 1, wherein the direct metal deposition tool defines a 3D printer head.

7. The sheet metal system having incremental forming and direct metal deposition of claim 1, wherein a final height of the rib includes multiple layers of material individually and sequentially deposited by the direct metal deposition tool.

8. The sheet metal system having incremental forming and direct metal deposition of claim 7, wherein the rib having the final height is repeated at multiple locations in the groove.

9. The sheet metal system having incremental forming and direct metal deposition of claim 1, wherein the groove includes opposed groove walls integrally connected to and transversely extending from a groove bottom wall, the groove bottom wall having a convex shaped outer surface in a longitudinal direction of the groove.

10. The sheet metal system having incremental forming and direct metal deposition of claim 1, wherein the groove includes:

a semi-spherical geometry having a semi-spherical shaped wall; and multiple ones of the ribs including intersecting first and second ribs integrally connected to the semi-spherical shaped wall and to a central connector.

11. The sheet metal system having incremental forming and direct metal deposition of claim 1, wherein the groove is formed by the incremental forming tool as a depression below a planar surface defined by a first plate portion and a second plate portion defining the first groove depth, the incremental forming tool further depressed into the groove to deepen the groove thereby creating the second groove depth greater than the first groove depth.

12. The sheet metal system having incremental forming and direct metal deposition of claim 11, wherein the groove at the first groove depth includes a first groove edge and an opposed second groove edge, and the groove at the second groove depth includes a third groove edge and an opposed fourth groove edge, and wherein the incremental forming tool creates an extended height rib connecting the third groove edge to the fourth groove edge.

* * * * *